(12) United States Patent
Bezelgues et al.

(10) Patent No.: US 8,609,875 B2
(45) Date of Patent: Dec. 17, 2013

(54) OIL CONTAINING ONE OR MORE LONG-CHAIN POLYUNSATURATED FATTY ACIDS PHOSPHOLIPIDS DERIVED FROM BIOMASS

(75) Inventors: Jean-Baptiste Bezelgues, Powell, OH (US); Junkuan Wang, Lonay (CH); Raymond Bertholet, Blonay (CH); Pierre Ducret, St-Saphorin-sur-Morges (CH)

(73) Assignee: Netsec S.A., Vevey (CH)

( * ) Notice: Subject to any disclaimer, the term of this patent is extended or adjusted under 35 U.S.C. 154(b) by 207 days.

(21) Appl. No.: 13/058,272

(22) PCT Filed: Jul. 22, 2009

(86) PCT No.: PCT/EP2009/059403
§ 371 (c)(1),
(2), (4) Date: Apr. 29, 2011

(87) PCT Pub. No.: WO2010/018049
PCT Pub. Date: Feb. 18, 2010

(65) Prior Publication Data
US 2011/0201683 A1     Aug. 18, 2011

(30) Foreign Application Priority Data
Aug. 11, 2008   (EP) .................................... 08162137

(51) Int. Cl.
| C07C 51/43 | (2006.01) |
| A01N 37/00 | (2006.01) |
| A61K 31/00 | (2006.01) |
| A23D 7/00  | (2006.01) |
| A23D 9/00  | (2006.01) |

(52) U.S. Cl.
USPC ............ 554/175; 554/223; 514/560; 426/601

(58) Field of Classification Search
USPC ............ 554/174, 223, 175; 514/560; 426/601
See application file for complete search history.

(56) References Cited

U.S. PATENT DOCUMENTS

| 2004/0109881 A1 | 6/2004 | Bertholet et al. |
| 2004/0234587 A1* | 11/2004 | Sampalis ..................... 424/450 |
| 2006/0068076 A1 | 3/2006 | Bertholet et al. |

FOREIGN PATENT DOCUMENTS

| CN | 1615822 | 1/2006 |
| EP | 1 239 022 | 9/2002 |
| EP | 1239022 A1 * | 9/2002 |
| EP | 1417211 | 5/2004 |
| EP | 1417211 A2 * | 5/2004 |
| WO | 02072742 | 9/2002 |

* cited by examiner

Primary Examiner — Deborah D Carr
(74) Attorney, Agent, or Firm — K&L Gates LLP

(57) ABSTRACT

The present invention relates to a method to extract long-chain polyunsaturated fatty acids from sources using emulsifiers dispersed in oil as carrier and to the oils obtainable from such a method. It also relates to the use of emulsifier in oil for improving the extraction of long-chain polyunsaturated fatty acids in the form of phospholipids and, in a further aspect, to an oil composition comprising long-chain polyunsaturated fatty acids in an amount up to 4% and phospholipids in an amount up to 15% and at least one emulsifier.

20 Claims, 2 Drawing Sheets

OIL CONTAINING ONE OR MORE LONG-CHAIN POLYUNSATURATED FATTY ACIDS PHOSPHOLIPIDS DERIVED FROM BIOMASS

FIELD OF THE INVENTION

The present invention relates to a method to extract long-chain polyunsaturated fatty acids (LC-PUFAs) in the form of phospholipids from biomass using emulsifiers dispersed in an oil as carrier and to the oils obtainable from such a method as a source of LC-PUFAs for food stuff, nutritional supplement, cosmetic or pharmaceutical composition. It also relates to the use of low HLB emulsifier in oil for improving the extraction of long-chain polyunsaturated fatty acids in the form of phospholipids and, in a further aspect, to an oil composition comprising LC-PUFAs in an amount up to 4% and phospholipids in an amount up to 10%

BACKGROUND OF THE INVENTION

Long chain polyunsaturated fatty acids (LC-PUFAs) such as e.g. arachidonic acid (ARA), eicosapentaenoic acid (EPA) and docosahexaenoic (DHA) acids, dihomogammalinolenic (DHGLA) are of interest in general public health. For several years, these fatty acids have been investigated for their roles in metabolic pathways and regulation processes. LC-PUFAs are associated with numerous health benefits such as alleviated symptoms of arthritis and a reduced risk of cardiovascular and inflammatory diseases and growth development of infants.

A large number of food applications have been developed with marine oils, which are rich in LC-PUFA in the form of triacylglycerols.

LC-PUFAs in the form of triacylglycerols can be obtained by a process of mixing, milling and pressing the dried biomass with a vegetable oil as described for example in EP 1 239 022 and US 2006/0068076. Although this method is efficient in obtaining LC-PUFAs when present as triacylglycerol in the biomass, it leads to very poor results when the LC-PUFAs from the biomass are mainly in form of phospholipids.

Recently, there has been a growing interest in developing LC-PUFAs in the form of phospholipids to enhance their bioavailability, bioefficacy and oxidative stability. Indeed, some papers assume that the nature of the glyceride structures which act as dietary carrier (e.g. triacylglycerol, phospholipids, etc.) of DHA for instance could play an important role in the absorption rate of DHA at the enterocyte level and, therefore, in its accretion rate in the targeted organs such as brain or eyes.

Marine biomasses such as krill or crustaceans represent an interesting source of LC-PUFAs in the form of phospholipids. The lipid composition of krill may contain for example 40-60% phospholipids, 20-30% triacylglycerols, free fatty acids and sterols. The fatty acids EPA and DHA are esterified almost exclusively in the form of phospholipids, mainly in phosphatidylcholine.

Krill is commercially available as dried powder and krill oil is obtained by solvent extraction or supercritical carbon dioxide extraction. EP 1 417 211 describes a process by which extraction of phospholipids is carried out by treatment with organic solvents such as ethanol, acetone, hexane. This process however can lead to the degradation of the phospholipids and requires a number of purification steps in order to get rid of solvent traces. Furthermore, the oil obtained by such a process is not only expensive, but is also very bad in smell and taste.

OBJECT OF THE PRESENT INVENTION

There is therefore a need to develop a method for the extraction of LC-PUFAs, in particular LC-PUFAs in the form of phospholipids, which is high yielding and does not require the use of organic solvents.

SUMMARY OF THE PRESENT INVENTION

This object is solved by means of the independent claims. The dependent claims further develop the central idea of the invention.

Thus, in a first aspect the present invention relates to a method to extract long-chain polyunsaturated fatty acids from a source comprising the steps of
a. mixing the source with an oil comprising at least one emulsifier
b. wet milling the mixture to form a slurry and
c. pressing the resulting slurry to obtain an oil comprising said long-chain polyunsaturated fatty acids
and to an oil obtainable by such a method.

For example, the oil used in step a. may be enriched with at least one emulsifier.

Additionally or alternatively step a. may involve mixing the source with an oil and at least one emulsifier.

The emulsifier may be added to the oil in a weight-ratio ranging from 1:6 to 1:1, for example from 1:2 to 1:5.

Another aspect of the invention relates to the use of at least one emulsifier in oil for improving the extraction of long-chain polyunsaturated fatty acids in the form of phospholipids from a biomass source.

An oil composition comprising long-chain polyunsaturated fatty acids in an amount up to 4% and phospholipids in an amount up to 10% also forms part of the present invention.

A third aspect of the invention pertains to an oil composition according to any of claims 11 to 13 for use in cosmetic and/or therapeutic treatment.

Finally, the use of an oil composition according to any of claims 11 to 13 in food also forms part of the present invention.

FIGURES

The present invention is further described below with reference to a preferred embodiment as illustrated in FIG. 1.

DETAILED DESCRIPTION OF THE INVENTION

Figure 1:
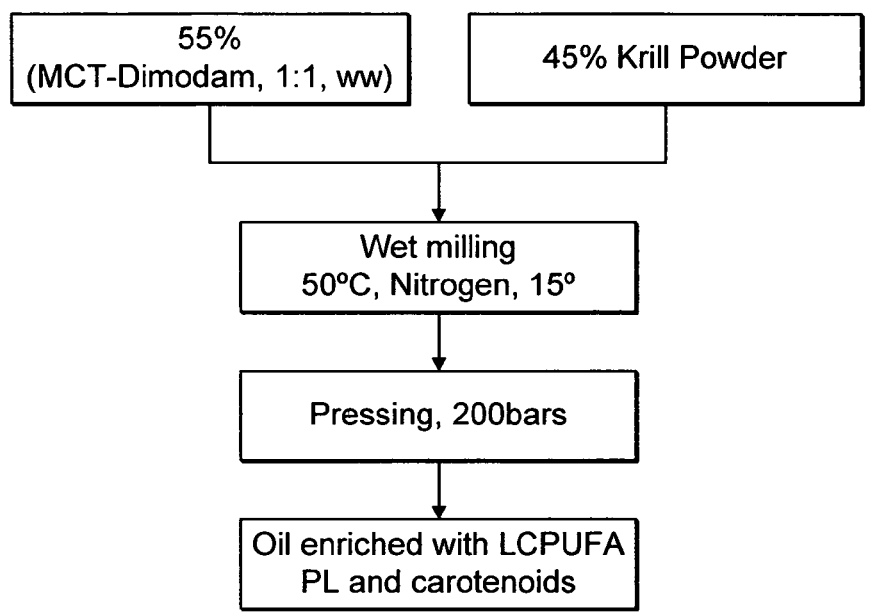
FIG. 1 is a flow-chart diagram showing the different stages of a process of the present invention.
Figure 2:
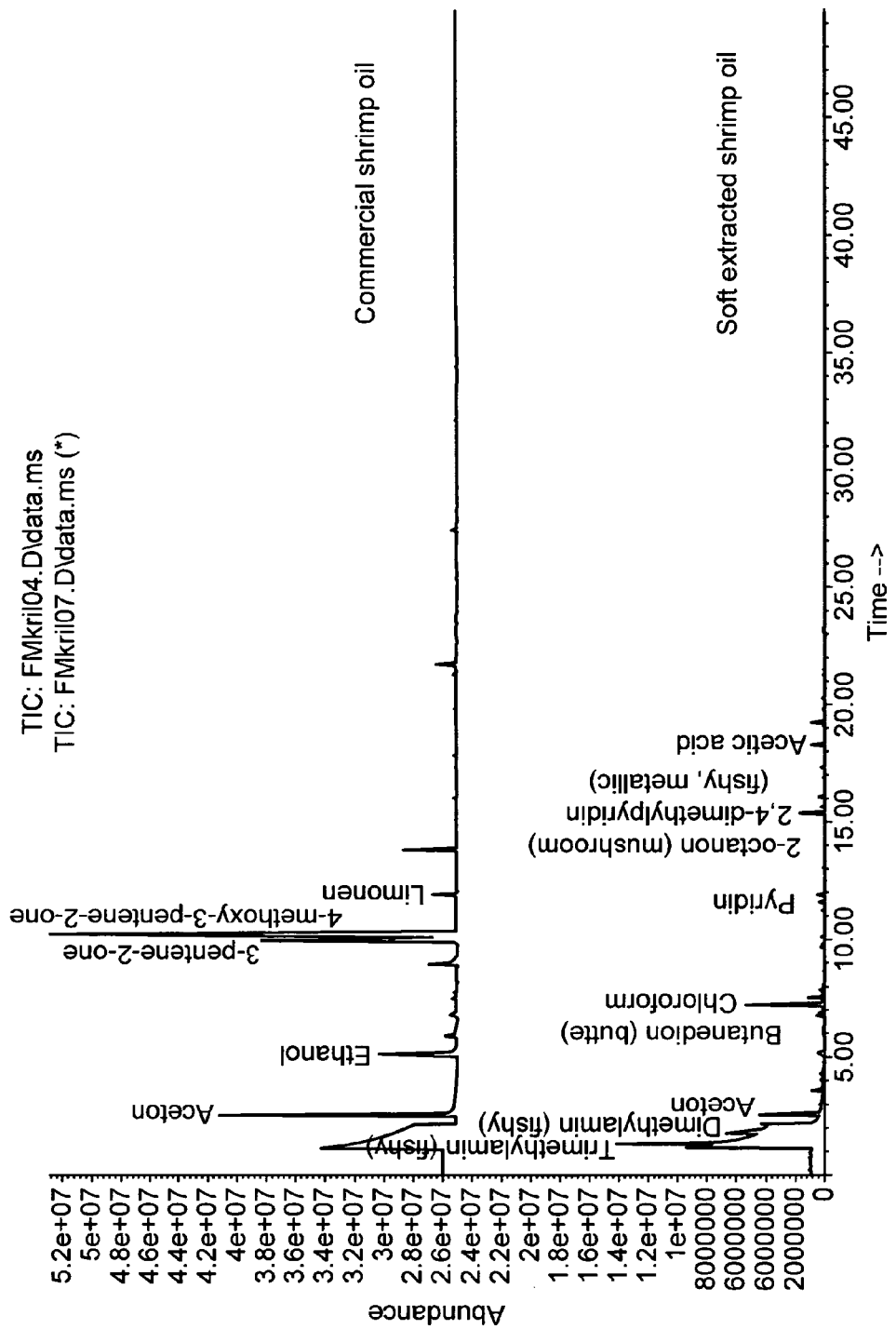
FIG. 2 shows a volatile profile (blue curve commercial shrimp oil, black curve soft extracted shrimp oil)

The present invention relates to the extraction of long-chain polyunsaturated fatty acids. By long-chain polyunsaturated fatty acids are meant fatty acids having an aliphatic chain of at least 18 carbons. These include linoleic acid, alpha-linolenic acid, dihomogammalinolenic acid, arachidonic acid, eicosapentaenoic acid, docosahexaenoic acid, etc. Preferably, the extracted long-chain polyunsaturated fatty acids are in the form of phospholipids. Thus, the fatty acids are esterified to a phosphoglycerol backbone.

Long-chain polyunsaturated fatty acids are present in a number of natural sources such as vegetable fat, animal fat but also in fish, zooplankton, crustaceans, microorganisms such as microalgae, fungus.

In the present invention, the preferred source is a dried biomass. More preferably, it is a marine dried biomass. This biomass may be selected from zooplankton (e.g. Krill) crustacean (e.g *Pandalus Borealis*), microalgae (e.g. *Isochrysis Galbana*) or by-products from fisheries such as fish heads, viscerae etc. Theses biomasses are particularly useful when fatty acids in the form of phospholipids are to be extracted.

The method of the present invention entails a first step of mixing the source with an oil comprising at least one emulsifier.

The oil may be selected from any of medium-chain triglyceride (MCT) oils, vegetable oil, essential oil or any mixtures thereof. The essential oil may be for example limonene. Preferably, the oil used is a vegetable oil selected from sunflower oil, rapeseed oil, soybean oil, palm oil, coconut oil or mixtures thereof.

The emulsifier may be selected from any emulsifiers having a hydrophilic-lipophilic balance of less than 7. The hydrophilic-lipophilic balance (HLB) of a surfactant is a measure of the degree to which it is hydrophilic or lipophilic, determined by calculating values for the different regions of the molecule, as described by Griffin in 1949[Journal of the Society of Cosmetic Chemists 1 (1949): 311] and 1954[Journal of the Society of Cosmetic Chemists 5 (1954): 259]. Briefly, the HLB may be calculated as follows:

$$HLB = 20 * M_H/M$$

where $M_h$ is the molecular mass of the hydrophilic portion of the Molecule, and M is the molecular mass of the whole molecule.

The resulting HLB will be a number on an arbitrary scale of 0 to 20. An HLB value of 0 corresponds to a completely hydrophobic molecule, and a value of 20 would correspond to a molecule made up completely of hydrophilic components.

Preferably, the emulsifiers used are food-grade. More preferably, the emulsifier is selected from monoglycerides, diglycerides, sorbitan monoesters such as sorbitan monolaurate, sorbitan monopalmitate, sorbitan monooleate, sorbitan monostearate, polypropylene glycol monoester, polyglycerol esters or any mixtures thereof. Most preferably, the emulsifier is a monoglyceride.

The oil to emulsifier weight-ratio may be ranging from 1:1 to 6:1, for example from 2:1 to 5:1. Therefore it may be 2:1, 3:1, 4:1, 5:1 or any intermediate value. The concentration of emulsifier in the oil may range from 5 to 50%, for example from 10% to 40%.

The biomass is preferably mixed into the oil in a weight-ratio of 5:95 to 50:50.

The source of LC-PUFA phospholipids and the oil comprising at least one emulsifier are then milled in a second step of the invention to form a slurry.

This grinding step may be carried out with any type of mill, preferably a colloidal mill. This step is preferably carried out at less than 60° C., more preferably at about 50° C.

The milling is carried out for a period of time ranging from 10 seconds to 2 minutes. Preferably, the milling is carried out for 1 minute.

The slurry obtained by milling the source with the oil/emulsifier mixture comprises particles which predominantly originate from the source. Preferably, at least 90% of the particles in the slurry have a particle size of less than 500 microns, preferably less than 300 microns. Particle size can easily be measured by the skilled person using a particle sizer for instance laser scaterring.

In a third step of the present method, the slurry is pressed to obtain an oil comprising long-chain polyunsaturated fatty acids. By "pressing" is meant subjecting the slurry resulting from the previous step to pressure. Thus, pressing can be carried out under pressure of 10 bars up to 500 bars. For this purpose a membrane filter press may be used. This typically exerts a pressure of up to 30 bars. Alternatively, a conventional hydraulic press may be used. Pressures of up to 500 bars can be achieved with such hydraulic press.

After pressing, oil comprising long-chain polyunsaturated fatty acids can be collected.

Preferably the steps of the present method are carried out at a temperature of 30° C. to 80° C.

Optionally, the method may comprise additional steps of removing the fines from the collected oil and deodorising said oil. Typically, the fines may be removed using deep filter cellulose sheet.

Deodorising the resulting oil may be done by steam stripping, for instance using a 1% per hour steam injection rate under 10 mbar of pressure and a temperature of between 80 and 140° C. Nitrogen stripping may equally be carried out, for example at a temperature of 80-140° C. under 10 mbar of pressure. Alternatively, short path molecular distillation can be carried out to deodorise the extracted oil.

The method of the invention thus allows to obtain an oil enriched with long-chain polyunsaturated fatty acids, in particular long-chain PUFAs in the form of phospholipids, without resorting to the use of organic solvents which have been traditionally used to extract polar lipids. By using neutral oil with an emulsifier, the process is natural and soft and allows the extraction of polar lipids in high yields. Indeed at least 80%, preferably at least 90% extraction yield can be achieved using the present method.

The purity of the resulting oil and its organoleptic properties are also improved compared to oils extracted with conventional organic solvents or using supercritical methods.

The resulting oil is therefore particularly suited for use not only in food, but also for use in cosmetic, pharmaceutical, nutraceutical, medical, nutritional compositions, where more natural processing methods are required (e.g. for infant formulas). It can therefore also be used in cosmetic and/or therapeutic treatments.

One embodiment of the present invention is an oil composition comprising per 100 g oil composition about 2-4 g, preferably about 2.5-3.5 g, palmitic acid; about 0.5-4 g, preferably about 1-2 g, stearic acid; about 8-12 g, preferably about 9-11 g, oleic acid; about 14-22 g, preferably about 16-20 g, linoleic acid; about 0-0.5 g, preferably about 0-0.2 g, linolenic acid; about 0.3-4 g, preferably about 0.5-2 g eicosaenoic acid (EPA); and/or about 0.3-4 g, preferably about 0.5-2 g, docosahexaenoic acid (DHA). This oil composition is obtainable the method described herein.

The present method is particularly suited for the extraction of long-chain polyunsaturated fatty acids in the form of phospholipids. Indeed, previous methods have either suffered from poor yields regarding these polar lipids or have made use of processes which are not cost effective and not natural, resorting to the use of polar solvents for example.

Referring to FIG. 1, MCT oil is mixed with a monoglyceride (Dimodan) in a ratio of 1:1. The oil/emulsifier mixture is then mixed with krill powder in an amount of 55% and 45% respectively. The mixture is then wet milled under nitrogen at 50° C. for 15 minutes to give a slurry. The resulting slurry is then pressed under 200 bars of pressure to yield oil enriched with long-chain polyunsaturated fatty acids in the form of phospholipids and carotenoids.

Therefore, the use of at least one emulsifier in an oil for improving the extraction of long-chain polyunsaturated fatty acids in the form of phospholipids from a source is also part of the present invention.

Indeed, it has been shown that the yield of extraction of the long-chain polyunsaturated fatty acids is greatly improved when at least one emulsifier is used. This is all the more advantageous over the prior art since extraction of long-chain polyunsaturated fatty acids in the form of phospholipids have hitherto been poorly extracted.

Using the extraction process of the invention, an oil containing a carotenoid can be obtained depending on the source used. For example, when using the preferred sources of the invention, the oil obtained by the process contains astaxanthin. This carotenoid is co-extracted into the oil when carrying out the process of the invention and provides the oil with additional advantages since carotenoids generally are potent natural antioxidants.

Oils comprising long-chain polyunsaturated fatty acids and an antioxidant can thus be obtained by the present method.

According to an aspect of the invention, an oil composition comprising long-chain polyunsaturated fatty acids in an amount up to 4% and phospholipids in an amount of up to 15% is provided. Other components include carotenoids.

The amounts of polyunsaturated fatty acids and phospholipids in the present oil composition correspond to at least 80%, preferably at least 90% of the theoretically extractable amount of long-chain polyunsaturated fatty acids and phospholipids from a source.

The oil composition of the present invention may be for use in cosmetic and/or therapeutic treatment. Such oil can be used as such in food stuffs (e.g. infant formulas, baby foods, dairy products, culinary products, cocoa beverages, chocolate, ice cream, cereal bars) or in the form of capsules, gelules, or encapsulated in glassy matrices.

EXAMPLES

Example

Two comparative examples were carried out. The conditions used where the same in both examples, i.e. wet milling of the source and oil under a nitrogen atmosphere at 50° C. for 15 seconds, followed by pressing using a conventional hydraulic press to 200 bars, and collecting the extracted oil.

In the first case, the extraction process was carried out with MCT oil alone. In the second case, the same process steps were carried out, except that the MCT oil was mixed with a monoglyceride emulsifier. The resulting extraction yields are shown in the table.

TABLE 1

DHA content in oil extracted with or without emulsifier.

| Source/oil mixture ratio | Theoretical % docosahexaenoic acid (DHA) if 100% extraction | Measured % DHA in extracted oil | Yield (%) |
|---|---|---|---|
| 45:55 Krill:MCT | 1.4 | 0.43 | 30.7 |
| 45:55 Krill:MCT + Dimodan | 1.4 | 1.15 | 82.15 |

The results in the table above clearly show the improvement in the extraction yield of long-chain fatty acids when using an oil/emulsifier mixture in the extraction of long-chain polyunsaturated fatty acid (DHA). The following table shows the difference of fatty acid profile of our extract (45% Shrimp powder/55% mix MCT/Dimodon U) and a shrimp oil extracted with organic solvent (Chloroforme/Methanol).

TABLE 2

Fatty acid profile of solvent extracted shrimp oil and soft (vegetable oil + emulsifier) extracted shrimp oil.

| Fatty acids | g/100 g oil (solvent extract) | g/100 g oil (Soft extract 45/55) |
|---|---|---|
| Palmitic acid | 7.80 | 3 |
| Stearic acid | 1.85 | 1.60 |
| Oleic acid | 11.65 | 10.2 |
| Linoleic | 0.60 | 18.44 |
| Linolenic | 0.25 | 0.10 |
| Eicosaenoic acid (EPA) | 9.60 | 1.25 |
| Docosahaenoic (DHA) | 8.45 | 1.15 |
| Others | 59.8 | 64.26 |

Note that the volatile profile of soft extract and commercial solvent extract are also different. As depicted below in the soft extract no acetone nor ethanol residues can be detected by SPME-GCMS.

The invention claimed is:

1. Method to extract long-chain polyunsaturated fatty acids from a source comprising the steps of:
   adding at least one emulsifier to an oil in a weight ratio from 1:6 to 1:1;
   mixing the source with the oil comprising the at least one emulsifier;
   milling the mixture to form a slurry; and
   pressing a resulting slurry to obtain an oil comprising the long-chain polyunsaturated fatty acids.

2. Method according to claim 1, wherein the long-chain polyunsaturated fatty acids are selected from the group consisting of linoleic acid, alpha-linolenic acid, dihomogamma-linolenic acid, arachidonic acid, eicosapentaenoic acid, docosahexaenoic acid and mixtures thereof.

3. Method according to claim 1, wherein the long-chain polyunsaturated fatty acids are in the form of phospholipids.

4. Method according to claim 1, wherein the source is a dried biomass.

5. Method according to claim 1, wherein the oil is selected from the group consisting of MCT oil, edible vegetable oil, essential oil and mixtures thereof.

6. Method according to claim 1, wherein the emulsifiers are selected from emulsifiers having a hydrophilic-lipophilic balance of less than 7.

7. Method according to claim 1, wherein the emulsifiers are selected from the group consisting of monoglycerides, diglycerides, sorbitan monoesters such as sorbitan monolaurate, sorbitan monopalmitate, sorbitan monooleate, sorbitan monostearate, polypropylene glycol monoesters, polyglycerol esters and mixtures thereof.

8. Method according to claim 1, wherein the pressing is carried out under from 10 to 500 bars.

9. A method comprising adding at least one emulsifier to an oil in a weight ratio from 1:6 to 1:1 to improve the extraction yield of long-chain polyunsaturated fatty acids in the form of phospholipids from a biomass.

10. Oil composition obtainable by adding at least one emulsifier to an oil in a weight ratio from 1:6 to 1:1; mixing a source of long-chain polyunsaturated fatty acids with the oil comprising the at least one emulsifier; milling the mixture to form a slurry; and pressing a resulting slurry to obtain an oil comprising the long-chain polyunsaturated fatty acids.

11. Oil composition comprising per 100 g of oil composition about 2 to 4 g palmitic acid, about 0.5 to 4 g stearic acid, about 8 to 12 g oleic acid, about 14 to 22 g linoleic acid, about 0 to 0.5 g linolenic acid, about 0.3 to 4 g eicosaenoic acid (EPA), and about 0.3 to 4 g docosahexaenoic acid (DHA).

12. Oil composition comprising long-chain polyunsaturated fatty acids in an amount up to 4%, phospholipids in an amount up to 10%, and at least one emulsifier in an amount up to 50% and in an oil to emulsifier weight ratio from 1:1 to 6:1.

13. Oil composition according to claim 11 comprising at least one carotenoid.

14. Oil composition according to claim 12 comprising at least one carotenoid.

15. A food comprising an oil composition comprising per 100 g of oil composition about 2 to 4 g palmitic acid, about 0.5 to 4 g stearic acid, about 8 to 12 g oleic acid, about 14 to 22 g linoleic acid, about 0 to 0.5 g linolenic acid, about 0.3 to 4 g eicosaenoic acid (EPA), and about 0.3 to 4 g docosahexaenoic acid (DHA).

16. A food comprising an oil composition comprising long-chain polyunsaturated fatty acids in an amount up to 4%, phospholipids in an amount up to 10%, and at least one emulsifier in an amount up to 50% and in an oil to emulsifier weight ratio from 1:1 to 6:1.

17. A cosmetic comprising an oil composition comprising per 100 g of oil composition about 2 to 4 g palmitic acid, about 0.5 to 4 g stearic acid, about 8 to 12 g oleic acid, about 14 to 22 g linoleic acid, about 0 to 0.5 g linolenic acid, about 0.3 to 4 g eicosaenoic acid (EPA), and about 0.3 to 4 g docosahexaenoic acid (DHA).

18. A cosmetic comprising an oil composition comprising long-chain polyunsaturated fatty acids in an amount up to 4%, phospholipids in an amount up to 10%, and at least one emulsifier in an amount up to 50% and in an oil to emulsifier weight ratio from 1:1 to 6:1.

19. The method of claim 1, wherein the oil comprises MCT oil, and the emulsifier comprises monoglycerides.

20. The oil composition of claim 10, wherein the long-chain polyunsaturated fatty acids are extracted from the source without organic solvents.

* * * * *